(12) United States Patent
Crabtree, III

(10) Patent No.: US 12,414,544 B2
(45) Date of Patent: Sep. 16, 2025

(54) PET EXERCISE BALL CONTAINMENT DEVICE

(71) Applicant: Richard Crabtree, III, Westerville, OH (US)

(72) Inventor: Richard Crabtree, III, Westerville, OH (US)

( * ) Notice: Subject to any disclaimer, the term of this patent is extended or adjusted under 35 U.S.C. 154(b) by 39 days.

(21) Appl. No.: 18/502,936

(22) Filed: Nov. 6, 2023

(65) Prior Publication Data

US 2025/0143264 A1    May 8, 2025

(51) Int. Cl.
*A01K 15/02* (2006.01)

(52) U.S. Cl.
CPC .................. *A01K 15/027* (2013.01)

(58) Field of Classification Search
CPC ................................ A01K 15/027
See application file for complete search history.

(56) References Cited

U.S. PATENT DOCUMENTS

| | | | |
|---|---|---|---|
| 8,161,913 B1 * | 4/2012 | Barfield | A01K 15/027 119/703 |
| D670,040 S | 10/2012 | Aboujaoude | |
| 2005/0120972 A1 | 6/2005 | Aboujaoude et al. | |
| 2014/0326194 A1 | 11/2014 | Waswo et al. | |
| 2015/0237830 A1 | 8/2015 | Sternal et al. | |
| 2020/0305393 A1 | 10/2020 | Ho | |
| 2021/0282372 A1 | 9/2021 | Haber et al. | |
| 2022/0132805 A1 | 5/2022 | Haber et al. | |

OTHER PUBLICATIONS

Alley Cats Bowling Ball Cup Stand with Ball Bearing Spinner Holder, https://alleycatsproducts.com/product/b08bcfr47y/, accessed Oct. 30, 2023 (2 pages).
Bowling Ball Spinner and Cleaning Stand, Etsy, https://www.etsy.com/uk/listing/1283369242/bowling-ball-spinner-and-cleaning-stand, accessed Oct. 30, 2023 (5 pages).
PSA: Clean Your Balls People!, https://www.reddit.com/r/Bowling/comments/yx8tay/psa_clean_your_balls_people_i_feel_this_is_highly/?rdt=56975, accessed Oct. 30, 2023 (8 pages).
SpinBusterz Bowling Ball Cup Spinner Sand Polish Clean Maintain Abralon, https://www.ebay.com/itm/255978082837, accessed Oct. 30, 2023 (6 pages).

* cited by examiner

*Primary Examiner* — Jessica B Wong
(74) *Attorney, Agent, or Firm* — Wilmer Cutler Pickering Hale and Dorr LLP

(57) ABSTRACT

The invention is directed to a pet exercise ball containment device comprising a receptacle having a substantially concave-shaped surface; three or more bearings attached to the substantially concave-shaped surface and arranged to receive the pet exercise ball; and one or more base components arranged on the receptacle to stabilize the pet exercise ball containment device. In some embodiments, the device can comprise an absorbent pad to collect waste from the pet. In some embodiments, the device can comprise an opening in the receptacle that allows waste to be emitted from the pet to a removable tray below the opening.

16 Claims, 10 Drawing Sheets

PET EXERCISE BALL CONTAINMENT DEVICE

FIELD OF THE INVENTION

The present invention relates to pet exercise toys. More particularly, the present invention relates to pet exercise ball containment devices and methods of providing a containment device for a pet exercise ball.

BACKGROUND OF THE INVENTION

Many small pets, such as hamsters, utilize various devices as a means for exercising and playing. Exercise wheels, for example, provide small pets with a means for continuously running, but do not provide them with a protective self-containing structure and can be noisy. In contrast, ball containers, such as pet exercise balls, allow small pets to be safely secured in a structure while they exercise and play. However, uncontained pet exercise balls pose many issues for the pet and its owner. If not contained, pet exercise balls can lead to the pet roaming freely about a home. This can be dangerous for the pet which can be kicked around or can fall down a flight of stairs. This can also be dangerous for other animals or people who can trip over the pet exercise ball. Pet owners must also ensure an area is clear of obstacles so a pet in an uncontained pet exercise ball is able to roam freely. An additional issue is the pet's waste can escape through holes in the uncontained pet exercise ball to the floor, causing a mess. Therefore, there is a need for a pet exercise ball containment device that provides a protective enclosure for the small pet, contains the enclosure itself in a single and safe location, and allows for the entrapment of the pet's waste.

SUMMARY OF THE INVENTION

The present disclosure is directed to pet exercise ball containment devices. The following embodiments recite non-limiting permutations of combinations of features of the inventions described. Other permutations of combinations of features are also contemplated and/or described throughout the disclosure.

In some embodiments, a pet exercise ball containment device is provided, comprising a receptacle having a substantially concave-shaped surface; three or more bearings attached to the substantially concave-shaped surface and arranged to receive the pet exercise ball; and one or more base components arranged on the receptacle to stabilize the pet exercise ball containment device. The receptacle can be a bowl and the substantially concave-shaped surface can be the interior of the bowl. In some embodiments, the substantially concave-shaped surface is substantially between 4 and 6 inches in diameter. The bearings can be spaced equidistant from each other on the substantially concave-shaped surface. In some embodiments, the bearings can have a diameter of at least 0.25 inches. The bearings of the pet exercise ball containment device can include a ball housed in a unit which can function as the base component.

In some embodiments, the pet exercise ball containment device can include a substantially concave-shaped surface that further comprises an absorbent pad to collect waste from the pet. In some embodiments, the receptacle can comprise an opening that allows waste to be emitted from the pet to a removable tray below the opening. The removable tray can be placed on a shelf below the opening and, in some embodiments, an absorbent pad can be placed on the removable tray.

In some embodiments, a method of providing a pet exercise ball containment device is provided, the method comprising providing a receptacle having a substantially concave-shaped surface; attaching three or more bearings to the substantially concave-shaped surface and arranging them to receive the pet exercise ball; and providing one or more base components arranged on the receptacle to stabilize the pet exercise ball containment device. In some embodiments, the method can include the step of providing a receptacle having a substantially concave-shaped surface further includes providing the receptacle is a bowl and the substantially concave-shaped surface is the interior of the bowl. The step of providing a substantially concave-shaped surface can further include providing the substantially concave-shaped surface is substantially between 4 and 6 inches in diameter. In some embodiments, the step of providing bearings can further include spacing the bearings equidistant from each other and/or providing the bearing have a diameter of at least 0.25 inches. The step of providing bearings can further include providing the bearings include a ball housed in a unit which can function as the base component.

In some embodiments, the step of providing a substantially concave-shaped surface can further comprise providing an absorbent pad on the substantially concave-shaped surface to collect waste from the pet. The step of providing a receptacle can further comprise providing an opening in the receptacle that allows waste to be emitted from the pet to a removable tray below the opening. In some embodiments, the method of providing a pet exercise ball containment device can further comprise placing the removable tray on a shelf below the opening in the receptacle. The method can also include providing an absorbent pad on the removable tray.

DETAILED DESCRIPTION OF THE INVENTION

In the following description, numerous specific details are set forth regarding the structures, systems, and methods of the disclosed subject matter and the environment in which such structures, systems, and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other structures, systems, and methods that are within the scope of the disclosed subject matter.

The disclosed structures, systems, and methods can provide a stable containment device for a pet exercise ball to allow the pet exercise ball to remain in one location while still allowing the pet to freely move around inside the rotating ball.

Figure 1A:
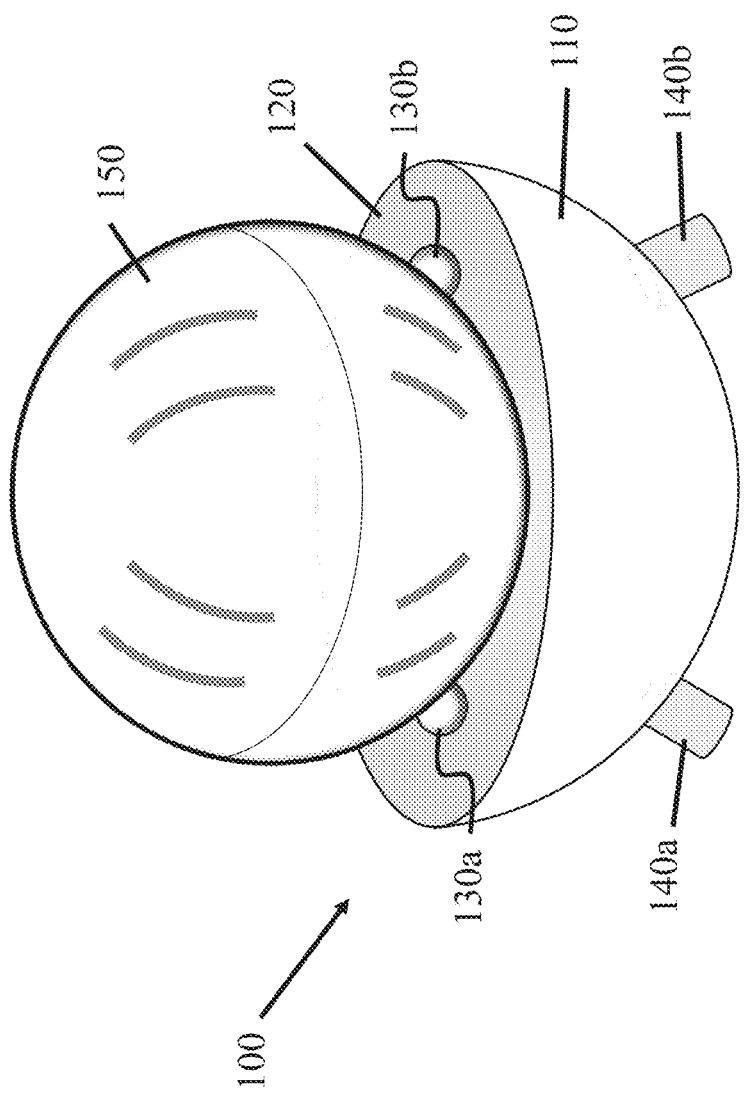
FIG. 1A is a front view of an exemplary embodiment of a pet exercise ball containment device described herein.
Figure 1B:
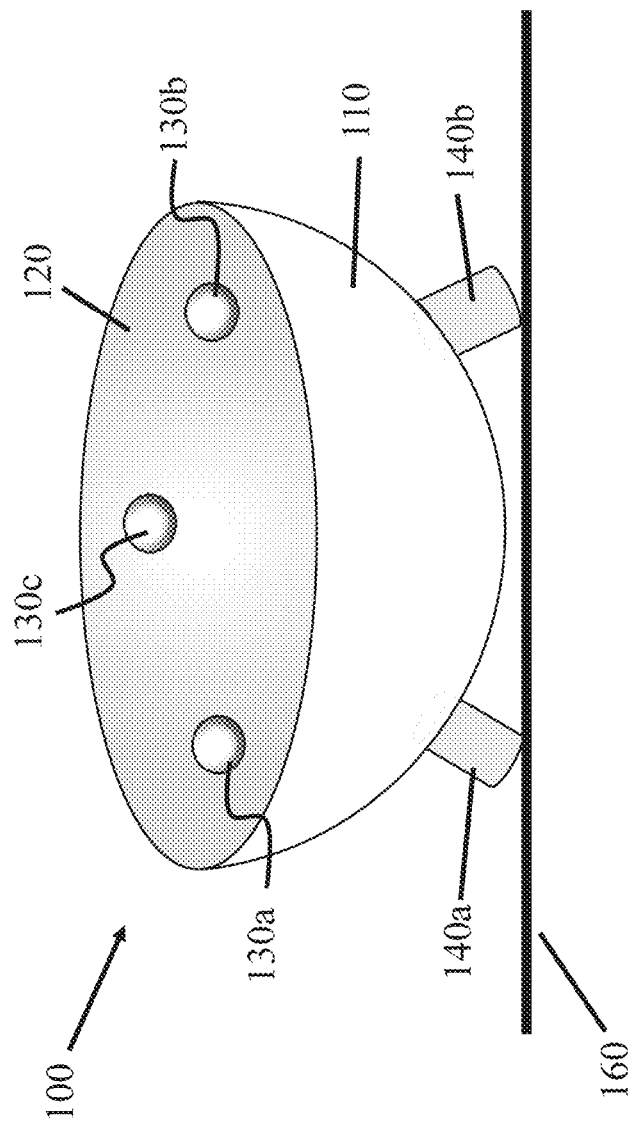
FIG. 1B is a front view of an exemplary embodiment of a pet exercise ball containment device described herein.

FIGS. 1A-1B show a pet exercise ball containment device 100, according to various embodiments described herein. The pet exercise ball containment device 100 comprises a receptacle 110 having a substantially concave-shaped surface 120, three or more bearings 130a-130c attached to the substantially concave-shaped surface 120 and arranged to receive the pet exercise ball 150, such as a hamster ball, and one or more base components 140a-140b arranged on the receptacle 110 to stabilize the pet exercise ball containment device 100. The pet exercise ball 150 includes small holes to allow the pet to breathe while preventing the pet from getting its hands and feet stuck in the holes.

The receptacle 110 can be constructed in a variety of shapes. For example, the receptacle 110 can be substantially in the shape of a hemisphere, sphere, ellipse, cylinder, polyhedron, or any other three-dimensional shapes known to those in the art, and any combination thereof. In one embodiment, for example, the receptacle 110 is in the shape of a bowl.

The receptacle 110 includes a substantially concave-shaped surface 120. In certain embodiments, the substantially concave-shaped surface 120 can be the interior of a bowl. The substantially concave-shaped surface 120 is sized to receive a pet exercise ball 150. In certain embodiments, the diameter of the substantially concave-shaped surface 120 can be substantially between 4 and 6 inches. In an example embodiment, the diameter of the substantially concave-shaped surface 120 can be 5 inches. In certain embodiments, the substantially concave-shaped surface 120 can be constructed from the receptacle 110 itself. In certain embodiments, the substantially concave-shaped surface 120 can be a separate structure attached to the receptacle 110.

The receptacle 110 can include one or more base components 140a-104b arranged on the receptacle 110 to stabilize the pet exercise ball containment device 100. In certain embodiments, the pet exercise ball containment device 100 can contain two, three, four, five, or more base components 140. The one or more base components 140a-140b can protrude from receptacle 110 and make contact with a surface 160, such as a horizontal tabletop or a floor, thereby stabilizing the pet exercise ball containment device 100. The one or more base components 140a-140b can be constructed in a variety of two-dimensional or three-dimensional shapes. For example, in certain embodiments, the one or more base components 140a-140b can be substantially in the shape of a circle, square, rectangle, polygon, sphere, ellipse, cylinder, cube, polyhedron, or any other shapes known to those in the art, and any combination thereof.

Figure 2:
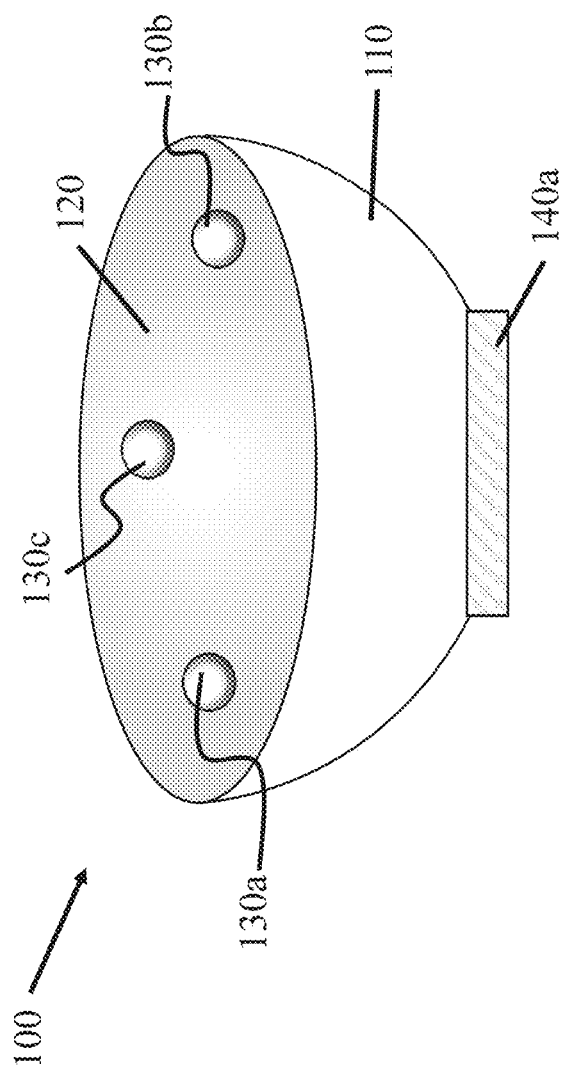
FIG. 2 is a front view of an exemplary embodiment of a pet exercise ball containment device described herein.
Figure 3:
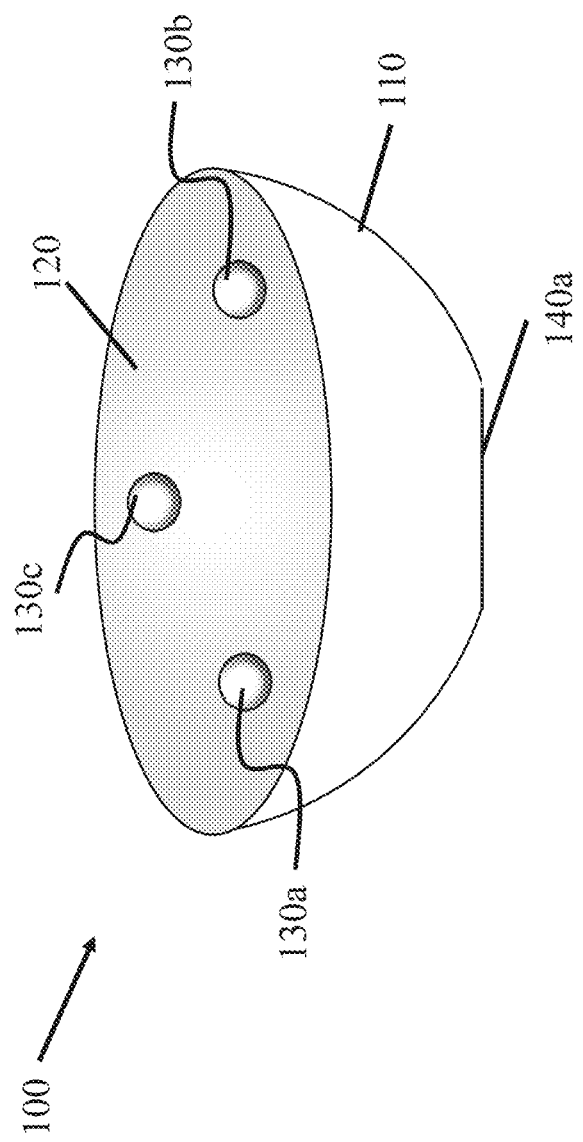
FIG. 3 is a front view of an exemplary embodiment of a pet exercise ball containment device described herein.

In certain embodiments, the one or more base components 140a-140b can be separate structures attached to the receptacle 110 by known means, such as screws, nails, pegs, glue, tape, insertion, and so on. In one example embodiment, the one or more base components 140a-140b can be cylindrical structures, as shown in FIGS. 1A-1B. As shown in FIG. 1B, for example, one or more base components 140a and 140b each protrude from the receptacle 110 and make contact with surface 160. In certain embodiments, one base component 140a can be a cuboidal structure, as shown in FIG. 2. In such embodiments, base component 140a in FIG. 2 acts as a platform to support and stabilize the device. In certain embodiments, the receptacle 110 can in-and-of-itself include a base component 140a formed into receptacle 110 that stabilizes the receptacle. For example, base component 140a can be formed as a substantially flat bottom surface of receptacle 110, as shown in FIG. 3, that stabilizes the receptacle when positioned on a horizontal surface, such as a table, shelf, or floor.

The receptacle 110, the substantially concave-shaped surface 120, and the one or more base components 140a-140b can be constructed from any material that is sufficiently rigid and sturdy to support the weight of a small animal. For example, they can be constructed from plastic, metal, steel, ceramic, wood, rubber, a substantially abrasive material, or any other sufficiently rigid and sturdy materials known to those in the art, and any combination thereof. Each of the receptacle 110, the substantially concave-shaped surface 120, and the one or more base components 140a-140b can be constructed from the same or different materials. In one embodiment, the receptacle 110 is formed of plastic in the shape of a bowl. In certain embodiments where the pet exercise ball containment device 100 is comprised of more than one base component 140, each base component can be constructed from different materials.

In certain embodiments, at least one of the receptacle 110, the substantially concave-shaped surface 120, the one or more base components 140a-140b, and/or the bearings 130a-130c can be constructed from or filled with materials that provide the pet exercise ball containment device 100 with enough weight to remain stabilized and immobile. For example, the receptacle 110 can be made of a solid metal material or be filled internally with sand to add weight to the pet exercise ball containment device 100.

The substantially concave-shaped surface 120 includes three or more bearings 130a-130c attached to the substantially concave-shaped surface 120 and arranged to receive a pet exercise ball 150. In one embodiment, the pet exercise ball containment device 100 is comprised of three bearings 130a-130c. In certain embodiments, the bearings 130a-130c can be at least 0.25 inches in diameter. In certain embodiments, the bearings 130a-130c can be less than or greater than 0.25 inches in diameter. Using bearings 130a-130c with a relatively small diameter (e.g., less than 0.25 inches) can require using more than three bearings 130a-130c to stabilize the pet exercise ball containment device 100. In certain embodiments, the bearings 130a-130c can be constructed from plastic, metal, steel, ceramic, wood, or any other sufficiently rigid and sturdy materials known to those in the art, or any combination thereof. In an example embodiment, the bearings 130a-130c are constructed from metal.

In an example embodiment, the bearings 130a-130c are spherical balls. In another example embodiment, the bearings 130a-130c are ball transfer bearings where a ball is housed in a transfer unit. In this embodiment, the ball can be positioned inside of the receptacle 110 while the transfer unit can extend outside of the receptacle 110 to function as a base component 140. In certain embodiments, the bearings 130a-130c are attached to the substantially concave-shaped surface 120 by being glued, taped, welded, screwed, nailed, inserted, or any combination thereof, into the substantially concave-shaped surface 120.

Figure 4:
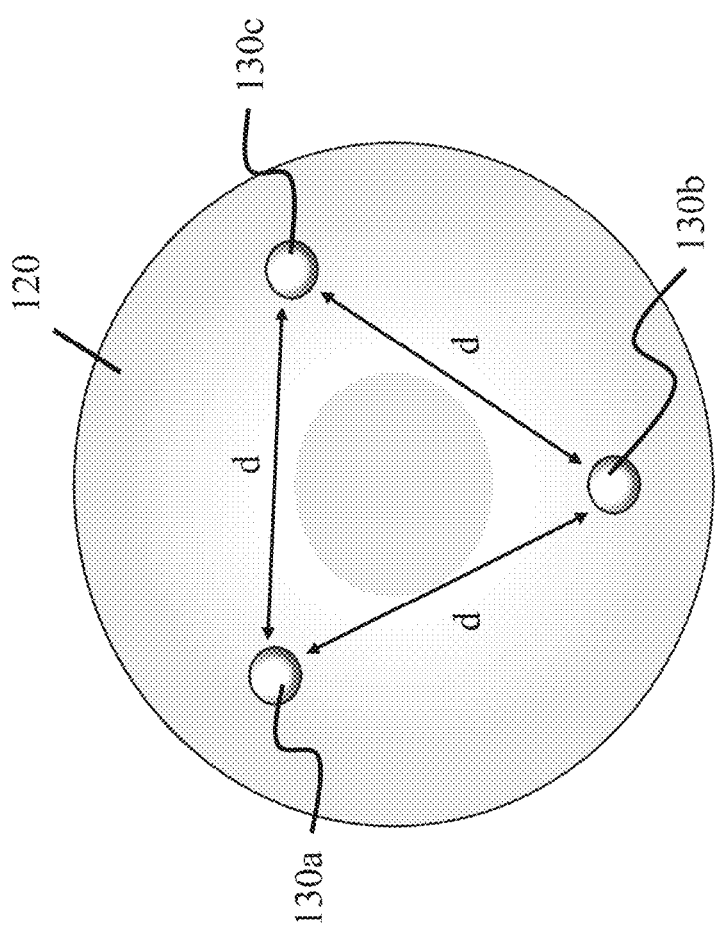
FIG. 4 is a top view of an exemplary embodiment of a pet exercise ball containment device described herein.

FIG. 4 shows a top view of an exemplary embodiment of a pet exercise ball containment device 100 described herein. In certain embodiments, the bearings 130a-130c are spaced equidistant from each other at a distance "d" on the substantially concave-shaped surface 120, as shown in FIG. 4. In other embodiments, the bearings 130a-130c can be positioned at varying distances from each other. In embodiments where more than three bearings 130 are used, those more than three bearings 130 can be positioned with equidistant or varying spacing from each other.

Figure 5:
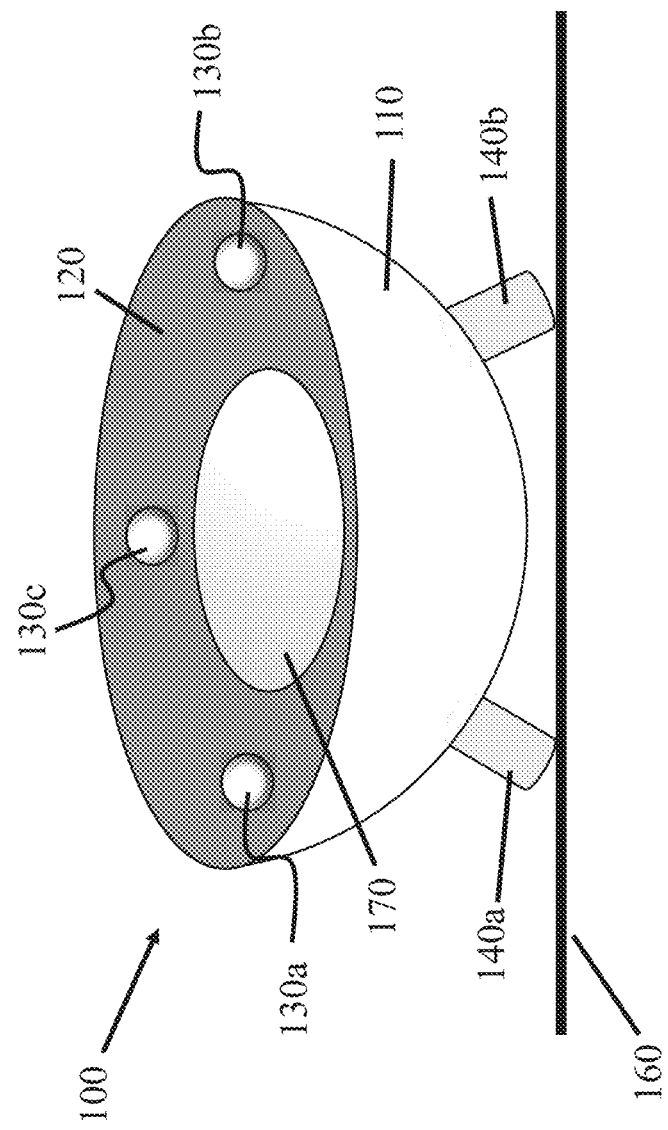
FIG. 5 is a front view of an exemplary embodiment of a pet exercise ball containment device described herein.

The pet exercise ball containment device 100 can allow for the removal of the pet's waste (e.g., urine, fecal matter, vomit, saliva) through small holes in the pet exercise ball 150 and onto, into, or through the receptacle 110. As an example, the substantially concave-shaped surface 120 of the receptacle 110 can catch waste which the pet owner can then remove. In an example embodiment, the substantially concave-shaped surface 120 can detach from the receptacle 110 to allow for the easy removal of the pet's waste. Room for the collection of waste is created in a volume between the substantially concave-shaped surface 120 of the receptacle 110 and the top of the bearings 130a-130c. Bearings 130a-130c with a larger diameter can be used to create more room for the collection of waste. FIG. 5 shows an example embodiment where the top of the receptacle 110 includes a hollow cavity 170 which would be located below the pet exercise ball 150 to provide more room for the collection of waste in the receptacle 110. The hollow cavity 170 can include an absorbent pad 180, described in more detail below. The hollow cavity 170 can also include a removable container to aid in the easy removal of waste. This removable container can be an extension of the substantially concave-shaped surface.

Figure 6:
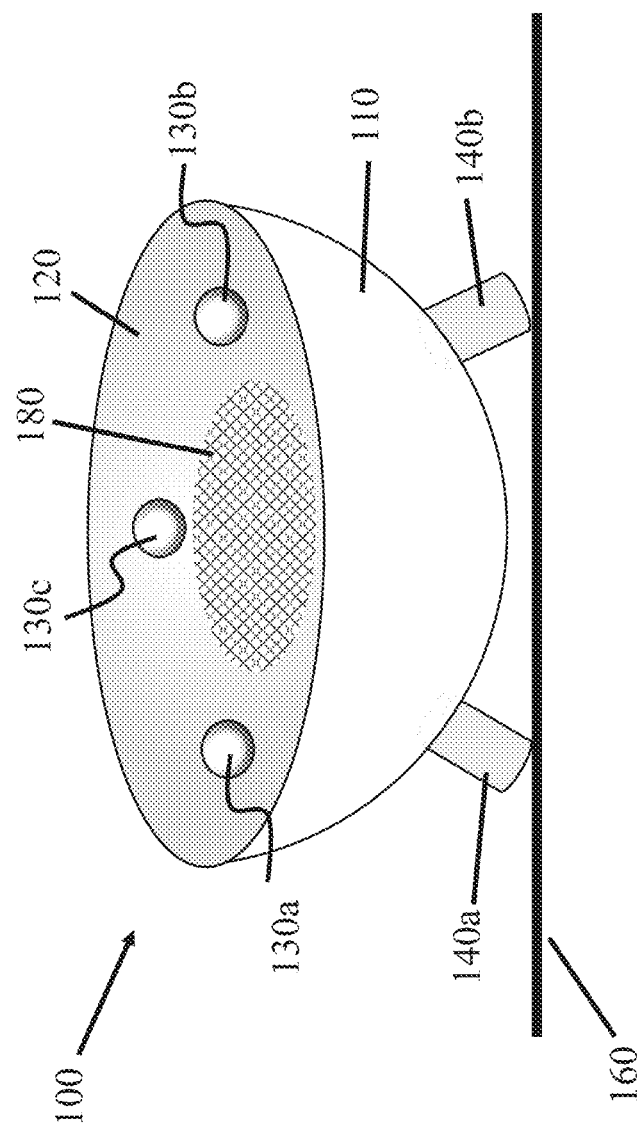
FIG. 6 is a front view of an exemplary embodiment of a pet exercise ball containment device described herein.

FIG. 6 shows an example embodiment where the substantially concave-shaped surface 120 of the receptacle 110 includes an absorbent pad 180 that can aid in the collection of waste released from the pet exercise ball 150. Examples of the absorbent pad 180 can be a paper towel, napkin, or cotton pad. The absorbent pad does not need to be attached to the substantially concave-shaped surface 120 of the receptacle 110. However, the absorbent pad 180 can attach to the substantially concave-shaped surface 120 of the receptacle 110 with adhesive material (e.g., glue, tape, Velcro) or by being pinned or sewn onto the substantially concave-shaped surface 120.

Figure 7:
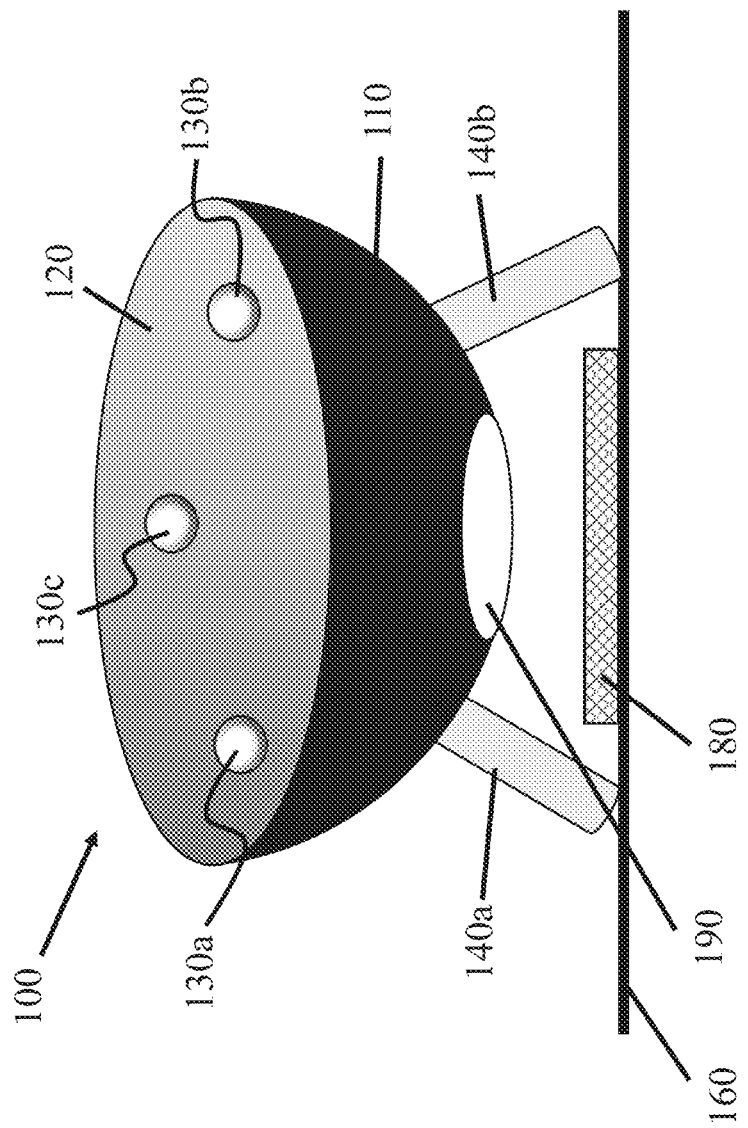
FIG. 7 is a front view of an exemplary embodiment of a pet exercise ball containment device described herein.
Figure 8:
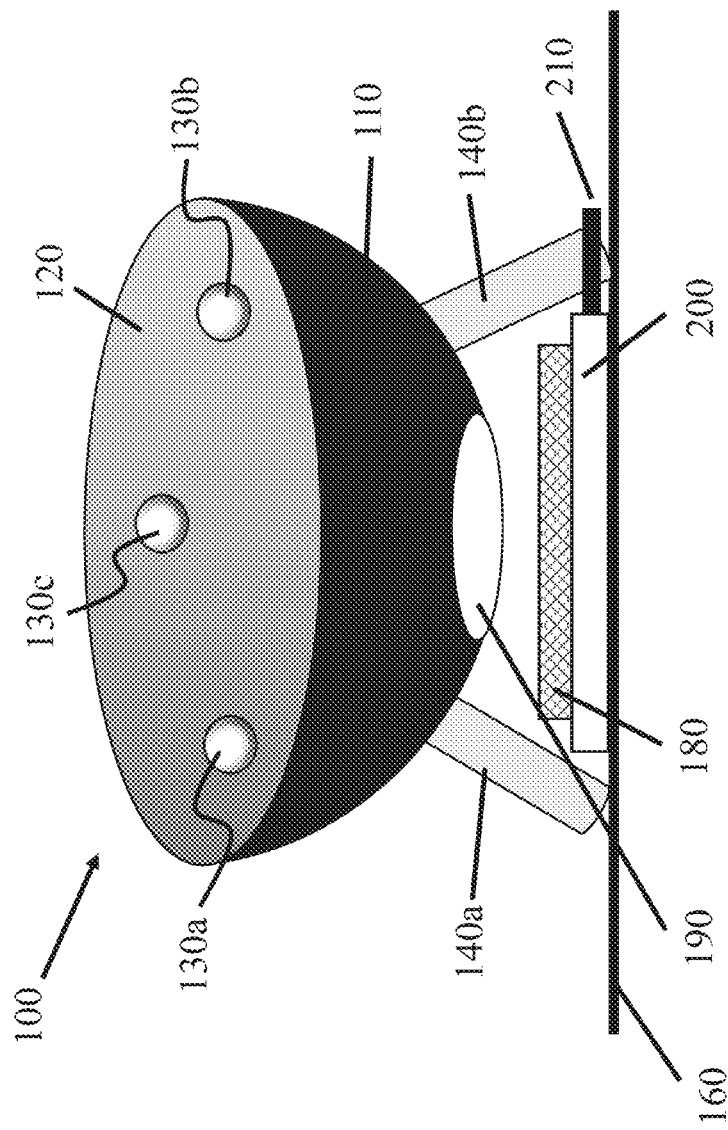
FIG. 8 is a front view of an exemplary embodiment of a pet exercise ball containment device described herein.

FIG. 7 shows another example embodiment where the pet exercise ball containment device 100 allows for the removal of the pet's waste. In this embodiment, the bottom of the receptacle 110 includes an opening 190 which allows the pet's waste to escape through the opening 190. An absorbent pad 180 is placed on a flat surface underneath the opening 190 to collect waste. Room for the collection of waste is created in a volume between the bottom of the receptacle 110 and the one or more base components 140a-140b on the flat surface. FIG. 8 shows another example embodiment where a removable tray 200 is placed on the flat surface underneath the opening 190 to collect the waste. The removable tray 200 can include a handle 210 to allow the pet owner to easily grab and remove it. The removable tray 200 can contain an absorbent pad 180 to aid in the collection and removal of waste. The removable tray 200 can be flat or have a concave-shaped structure.

Figure 9:
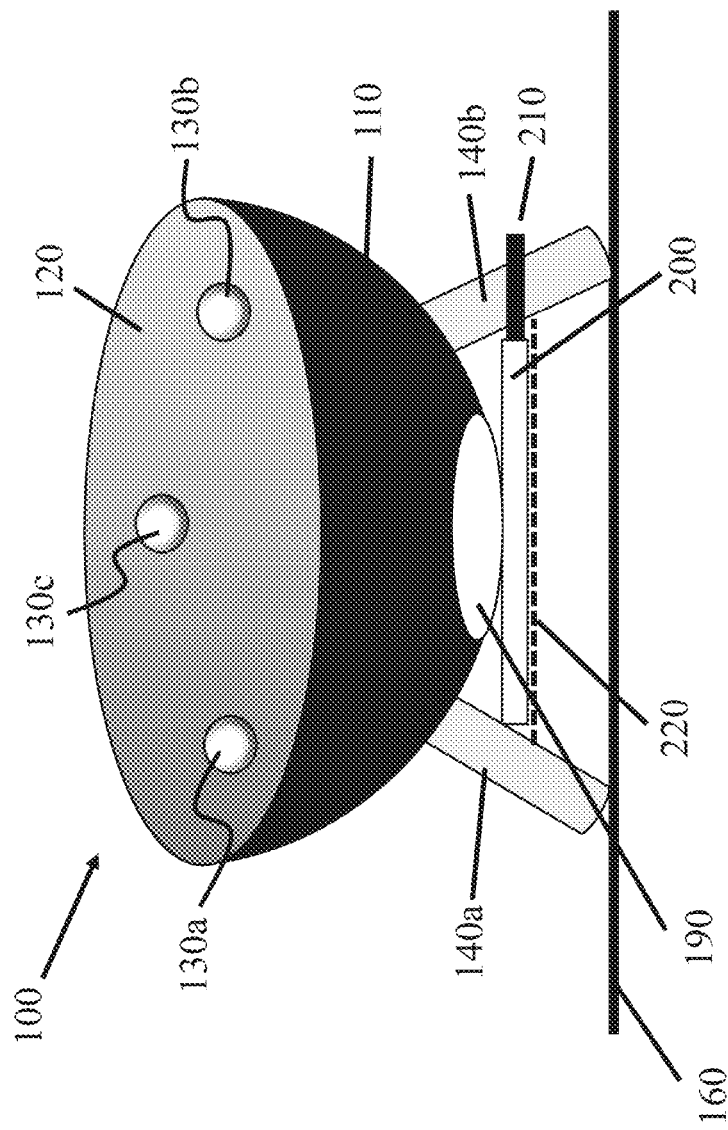
FIG. 9 is a front view of an exemplary embodiment of a pet exercise ball containment device described herein.

The removable tray 200 can be removably attached to the pet exercise ball containment device 100. FIG. 9 shows an embodiment where a shelf 220 is attached to the base components 140-140b and is used to hold the removable tray 200 and to position the removable tray 200 below the opening 190 to collect waste. The removable tray 200 can contain an absorbent pad 180 to aid in the collection and removal of waste. The shelf can also only contain an absorbent pad 180. In an example embodiment, the removable tray 200 is removably attached to the receptacle 110 and configured like a drawer that can collect waste and can slide out of the receptacle 110 to dispose of waste.

In certain embodiments, the pet exercise ball containment device 100 can include light features, such as LED lighting. Light features can be integrated into or onto any component of the pet exercise ball containment device 100. In an example embodiment, light features are integrated around the perimeter of the substantially concave-shaped surface 120 of the receptacle 110. In another example embodiment, light features are integrated inside of the receptacle 110 and shines light out of the receptacle 110 through holes in the receptacle 110 or due to the receptacle 110 being translucent or transparent.

What is claimed is:

1. A pet exercise ball containment device, comprising:
   a receptacle having a substantially concave-shaped surface comprising an absorbent pad arranged to collect waste from a pet;
   three or more bearings attached to the substantially concave-shaped surface and arranged to receive a pet exercise ball; and
   one or more base components arranged on the receptacle to stabilize the pet exercise ball containment device.

2. The pet exercise ball containment device of claim 1, wherein the receptacle is a bowl and the substantially concave-shaped surface is the interior of the bowl.

3. The pet exercise ball containment device of claim 1, wherein the substantially concave-shaped surface is substantially between 4 and 6 inches in diameter.

4. The pet exercise ball containment device of claim 1, wherein the bearings are spaced equidistant from each other on the substantially concave-shaped surface.

5. The pet exercise ball containment device of claim 1, wherein the bearings have a diameter of at least 0.25 inches.

6. The pet exercise ball containment device of claim 1, wherein the receptacle further comprises an opening that allows waste to be emitted from the pet to a removable tray below the opening.

7. The pet exercise ball containment device of claim 6, wherein the removable tray is placed on a shelf below the opening.

8. The pet exercise ball containment device of claim 6, wherein an absorbent pad is placed on the removable tray.

9. A method of providing a pet exercise ball containment device, comprising:
   providing a receptacle having a substantially concave-shaped surface comprising an absorbent pad arranged to collect waste from a pet;
   attaching three or more bearings to the substantially concave-shaped surface and arranging them to receive a pet exercise ball; and
   providing one or more base components arranged on the receptacle to stabilize the pet exercise ball containment device.

10. The method of providing a pet exercise ball containment device of claim 9, wherein the step of providing a receptacle having a substantially concave-shaped surface further includes providing the receptacle is a bowl and the substantially concave-shaped surface is the interior of the bowl.

11. The method of providing a pet exercise ball containment device of claim 9, wherein the step of providing a substantially concave-shaped surface further includes providing the substantially concave-shaped surface is substantially between 4 and 6 inches in diameter.

12. The method of providing a pet exercise ball containment device of claim 9, wherein the step of providing bearings further includes spacing the bearings equidistant from each other.

13. The method of providing a pet exercise ball containment device of claim 9, wherein the step of providing bearings further includes providing the bearings have a diameter of at least 0.25 inches.

14. The method of providing a pet exercise ball containment device of claim 9, wherein the step of providing a receptacle further comprises providing an opening in the receptacle that allows waste to be emitted from the pet to a removable tray below the opening.

15. The method of providing a pet exercise ball containment device of claim 14, further comprising placing the removable tray on a shelf below the opening in the receptacle.

16. The method of providing a pet exercise ball containment device of claim 14, further comprising providing an absorbent pad on the removable tray.

\* \* \* \* \*